Aug. 5, 1952 — J. J. ROCK — 2,605,988
MOVABLE CONTROL PENDANT FOR MACHINE TOOLS
Filed Sept. 16, 1947 — 3 Sheets-Sheet 1
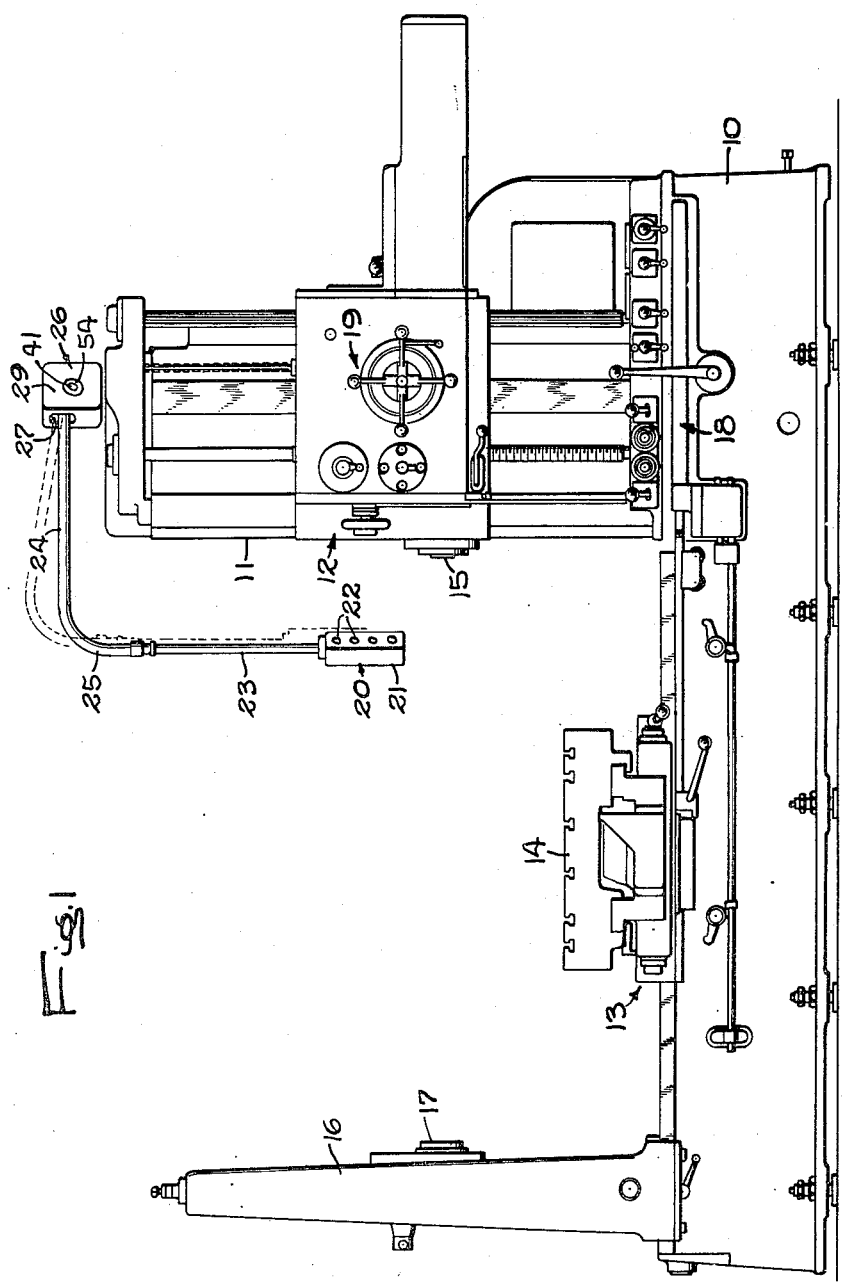
INVENTOR
Joseph J. Rock
By Carlson, Pitzner, Hubbard & Wolfe
ATTORNEYS

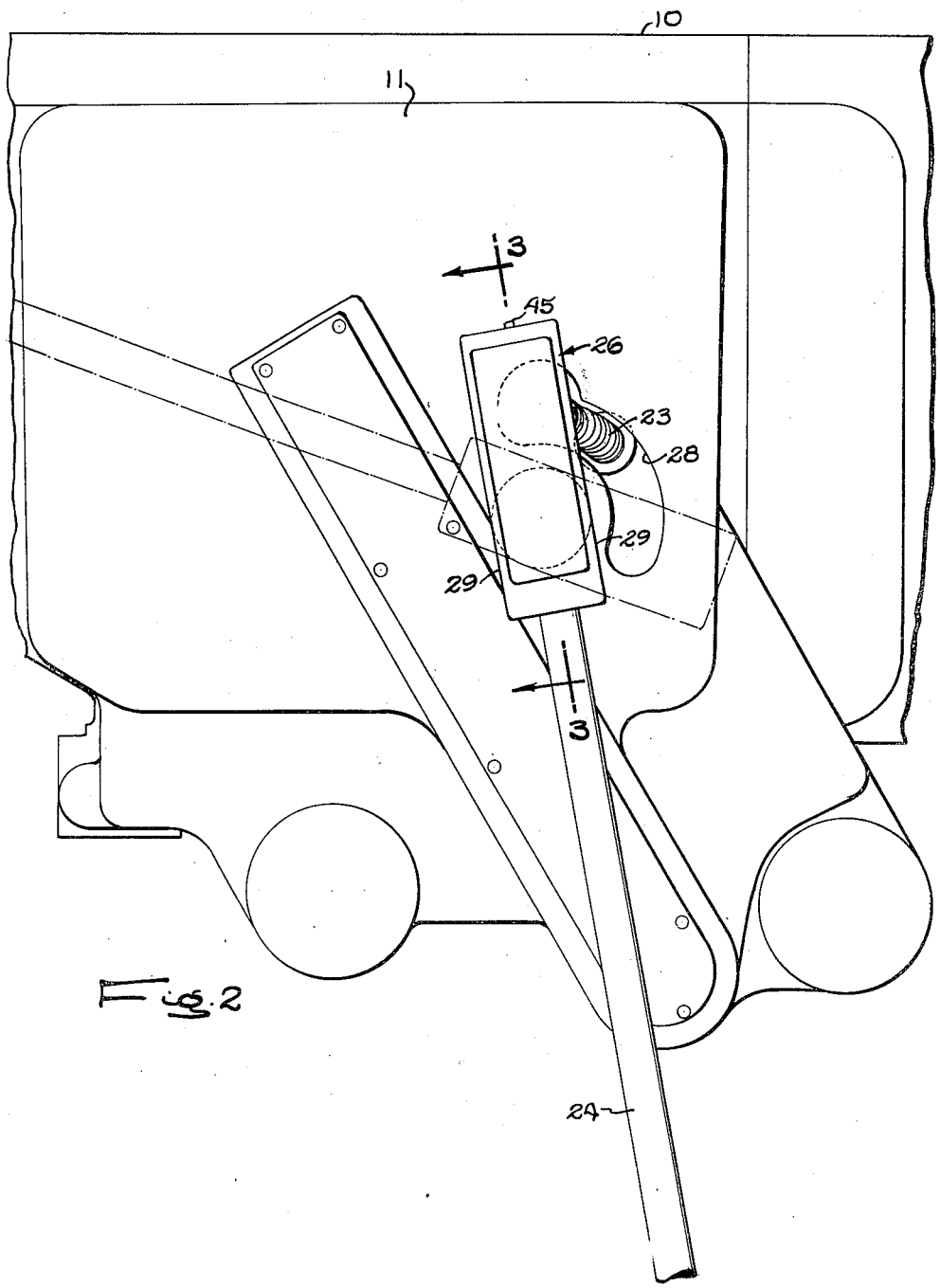

Aug. 5, 1952        J. J. ROCK        2,605,988
MOVABLE CONTROL PENDANT FOR MACHINE TOOLS
Filed Sept. 16, 1947        3 Sheets-Sheet 3
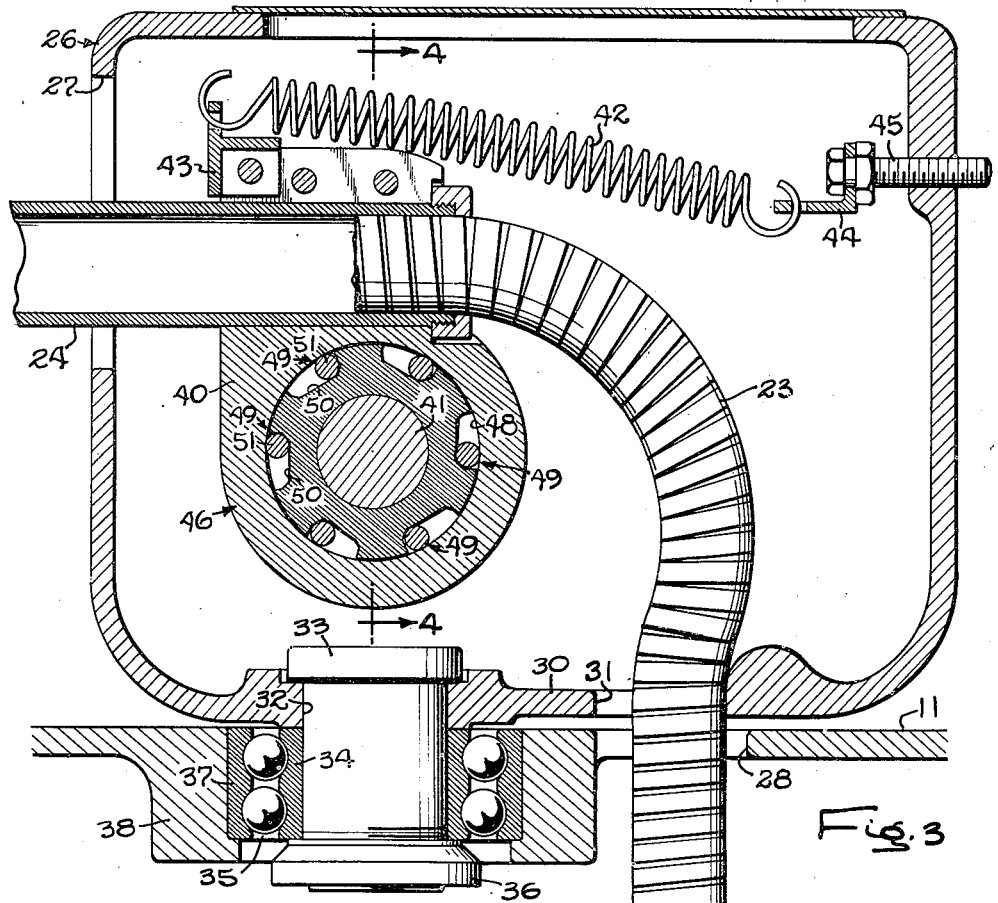
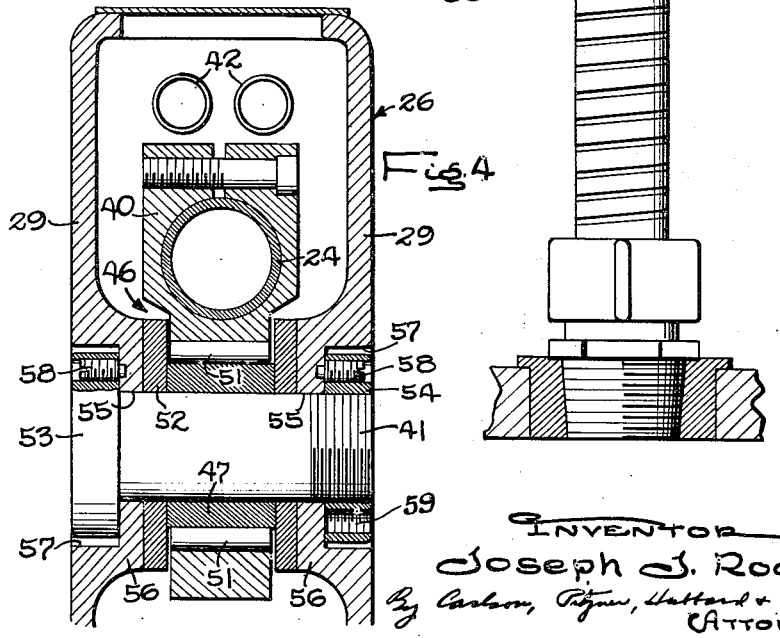
INVENTOR
Joseph J. Rock Patented Aug. 5, 1952

2,605,988

UNITED STATES PATENT OFFICE 2,605,988

MOVABLE CONTROL PENDANT FOR MACHINE TOOLS

Joseph J. Rock, Fond du Lac, Wis., assignor to Giddings & Lewis Machine Tool Company, Fond du Lac, Wis., a corporation of Wisconsin Application September 16, 1947, Serial No. 774,279

2 Claims. (Cl. 248—292)

The present invention relates to improvements in movable control pendants for machine tools.

One of the objects is to provide a control pendant with an improved mount permitting horizontal swivel adjustment and vertical adjustment with ease and dispatch.

Another object is to provide improved means for counterbalancing the pendant.

A more specific object is to provide, in combination with a counterbalancing means exerting an upward force, of a friction brake operable to resist downward movement of the pendant, and ineffective to resist upward movement thereof.

Further objects and advantages will become apparent as the description proceeds.

In the accompanying drawings,

Figure 1 is a front view of a horizontal boring, drilling and milling machine equipped with a control pendant embodying the features of the present invention.

Fig. 2 is a fragmentary plan view of the pendant mount.

Fig. 3 is a vertical sectional view of the mount taken along line 3—3 of Fig. 2.

Fig. 4 is a transverse vertical sectional view taken along line 4—4 of Fig. 3.

Referring more particularly to the drawings, the pendant, constituting the exemplary embodiment of the invention, may be adapted for use on various types of machine tools requiring a control station. For purposes of illustration, it is shown as applied to one type of horizontal boring, drilling and milling machines. As shown, the machine comprises a horizontal bed 10, a vertical column 11 on one end of the bed, a spindle headstock 12 mounted on the column for vertical power translation, a saddle 13 slidable longitudinally on the bed, and a worktable 14 slidable transversely on the saddle. The headstock 12 supports a main horizontal spindle 15 for power rotation and axial translation. A tailstock column 16, supporting a slide 17 in alignment with the spindle 15 for joint power translation with the headstock 12, may be mounted on the free end of the bed. Suitable control elements illustrated collectively at 18 and 19 are conventionally provided on the bed 10 and headstock 12 for controlling the drive means (not shown) for selectively operating the machine elements 12, 13, 14, 15 and 17. The specific construction and operation of the drive means and control elements form no part of the present invention, and hence are not disclosed in detail. It is sufficient to state that various machine functions are subject to electrical control through the medium of hand-operable push-button or other types of switches or regulating elements assembled in a control panel at some convenient station.

The present invention relates to a movable pendant 20 which may be equipped with the electrical control elements required for any particular machine, and which thus constitutes such a control panel. The pendant 20 may define the only control station, or be one of dual stations. For the convenience of the machine operator, the pendant 20 comprises a housing 21 which is of a size and shape adapted to be grasped in the hand, and which is adapted to be adjusted into different locations relative to the machine structure. The housing 21 encloses the necessary electrical devices in a compact arrangement, and supports the manual control elements, such for example as the push buttons indicated at 22, for external actuation.

To permit easy and expeditious location of the control pendant 20 in different positions of use, it is supported, in the present instance, from the top of the column 11, for swivel adjustment through a predetermined arcuate range in a horizontal plane and for up or down vertical adjustment to the desired height. More particularly, the pendant 20 is suspended from the lower end of a flexible electric cable 23 through which the electric lead wires (not shown) are extended. The cable 23 extends upwardly into and through a forwardly projecting hollow arm 24 preferably in the form of a rigid conduit or tube having a short downwardly bent elbow 25 at its outer end. The rear or inner end of the tubular arm 24 projects into and is supported within a suitable housing 26 for swivel adjustment in a vertical plane. To permit such swivel adjustment, the arm 24 actually extends through a vertical slot 27 in the front wall of the housing 26. The latter in turn is mounted for horizontal swivel adjustment about a vertical axis on the top of the column 11. From the inner end of the arm 24, the electric cable 23 extends in a curve downwardly in the housing 26, and therefrom through a slot 28 arcuate about the vertical swivel axis in the top wall of the column for connection to the electrical devices (not shown) controlled from the pendant 20. Sufficient slack is provided in the cable 23 to permit swivel movement of the housing 26.

The swivel housing 26 may be of any suitable shape and construction, and in the present instance is upright and narrow with parallel slightly distortable side walls 29. The bottom wall 30, apertured at 31 to permit egress of the cable 23, is formed with a flanged opening 32 constituting a seat for a depending pivot pin 33. The inner race 34 of an anti-friction ball bearing 35 snugly encircles the pin 33, and a nut 36 on the latter serves to clamp the parts 33, 34 in rigid assembled relation with the housing 26. The outer race 37 of the bearing 35 is rigidly secured in a fixed sleeve 38 formed in the top wall of the column 11. Thus, the pin 33 defines the vertical swivel axis of the housing 26.

To provide a swivel support for the arm 24, the inner end extends through and is rigidly fixed in a split clamp on a block 40 rotatably mounted on a fixed transverse shaft 41 within the housing 26. The pendant 20, cable 23 and arm 24 have, of course, a predetermined weight tending to swing the arm downwardly. To counterbalance this weight, resilient means is provided in the housing 26 tending at all times to swivel the arm in an upward direction about the shaft 41. In the preferred construction, coiled tension springs 42 are connected at their forward ends to a lug 43 on the forward edge of the block 40, and are adjustably anchored at their rear ends to the rear wall of the housing 26. Specifically, the rear end of each spring 42 is connected to a lug 44 on an adjusting screw 45 adjustably threaded through the housing wall.

One of the problems presented is to obtain a normal state of equilibrium in any position of vertical adjustment of the pendant 20 despite the weight of the forwardly offset parts, and at the same time to facilitate ready adjustment in either direction. This is accomplished by providing a one-way friction brake 46 which is automatically operable to supplement the resisting force of the springs 42 against downward adjustment of the arm 24, but is ineffective to resist upward adjustment of the arm by the springs. The springs 42 are so tensioned that when the arm 24 is relieved of the weight of the pendant 20, they will effect upward adjustment.

The friction brake 46 comprises a friction ring 47 adapted to be rotated in one direction by a one-way coupling 49 associated with the support block 40. More specifically, the ring 47 is formed with a series of wedge notches 50 in its outer peripheral face and is inserted with a snug rotary fit into a bore 48 opening through the block 40. Suitable rollers 52 are confined within the notches 50 to cooperate with the surfaces of the notches and the inner surface of the bore 48 to form the one-way coupling which serves upon rotation of the block 40 in a counterclockwise direction, as viewed in Fig. 3, to couple the ring 47 for rotation therewith, and permit free independent rotation of the block in the opposite or clockwise direction.

The ring 47 is rotatably confined on the shaft 41 to complete the swivel connection for supporting the arm 24. The ring also constitutes the movable friction element of the brake 46, and to this end is frictionally disposed between two axially spaced annular friction disks 52 encircling the shaft 41 and anchored to the opposed inner surfaces of the side walls 29 of the housing 26. It will thus be evident that the opposite side faces of the ring 47 define annular brake surfaces in frictional engagement with the contacting surfaces of the disks 52 to resist rotation of the ring 47. The housing 26 cooperates in this action by forming an anchor against which the one-way brake may react in resisting downward movement of the arm 24.

To permit adjustment of the frictional drag in one direction imposed by the brake 46, the shaft 41 is provided in the form of a bolt having a head 53 on one end and a nut 54 on the other end, and hence constitutes a clamping element adapted to flex the side walls 29 of the housing 26 so as to vary the bearing pressure between the brake surfaces. More particularly, the shaft or bolt 41 is extended through bores 55 in inwardly projecting bosses 56 formed on the side walls 29 and against which the disks 52 are seated. The bosses are formed in the outer surfaces with concentric circular recesses or counterbores 57. The bolt head 53 is seated in one of the recesses 57, and the nut 54 is seated in the opposed recess and adapted to be tightened on the bolt by means of a spanner wrench to flex the walls 29 inwardly for coarse friction adjustment. A dog point set screw 58 is threaded through the head 53 for end engagement against the inner surface of the associated recess 57 to maintain the bolt 41 against rotation. To effect fine adjustment of the brake friction, flat point set screws 59 are threaded through circumferentially spaced holes in the nut 54 for end bearing engagement with the inner surface of the related recess 57. A dog point set screw 58 is also threaded through a hole in the nut intermediate the holes occupied by the flat point set screws 59, said screw 58 serving to clamp nut 54 in position.

In operation, downward adjustment of the pendant 20 may be effected simply by exerting a downward pull thereon. In this instance, the one-way coupling 49 is automatically engaged to interpose the drag or resistance of the friction element 47 which supplements the resistance of the counterbalancing springs 42 against such downward movement. The force required in lowering the pendant 20 against the resistance of the brake 46 is of no substantial moment since the flexible cable 23 will be taut. Moreover, the tension of the springs 42 and the friction of the brake 46 are so adjusted as to substantially counterbalance the weight of the pendant 20, cable 23 and arm 24. Consequently, only a comparatively light pull is required, and after adjustment has been effected, the pendant will remain in balanced position. Upward vertical adjustment may be effected simply by lifting the pendant 20 manually to the desired height. This will remove the weight of the pendant 20 from the cable 23, and, since the brake 46 is ineffective in this direction of movement, the counterbalancing springs 42 have only the weight of the arm 24 to overcome, and will effect a corresponding upward adjustment of the arm until the slack in the cable is taken up and the balanced relationship is reestablished.

I claim as my invention:

1. A pendant control device for a machine tool, comprising, in combination, a generally horizontal arm, a swivel block rigidly connected to the inner end of the arm, the block being provided with a bore transverse to the arm, a flexible electric cable extending from the inner to the outer end of the arm and then downwardly therefrom, a control pendant suspended from the arm on the lower end of said cable, the pendant being provided with electrical control elements for the machine tool, a clutch ring rotatably positioned in said bore in the swivel block, a pivot supporting the ring for rotation, a support for mounting the pivot in a horizontal position on the machine tool, a counterbalancing element connected to the arm through the swivel block and of sufficient strength to counterbalance the weight of said arm but not that of the pendant, a pair of brake members on said support engaging the opposite ends of the clutch ring with sufficient force to restrain the arm frictionally against downward movement under the weight of the pendant, a plurality of wedge recesses disposed between the swivel block and the clutch ring and formed out of the interengaging surfaces thereof, and respective wedge dogs in the recesses for locking the swivel block to the clutch ring upon downward movement of the arm under the weight of the pendant and for releasing the swivel block for free upward movement under the impetus of the counterbalancing element when the arm is relieved of the weight of the pendant.

2. A pendant control device for a machine tool, comprising a housing adapted to be mounted bodily on the machine tool for swivel adjustment about a vertical axis, said housing comprising spaced parallel flexible side walls and an end wall having a vertical slot therethrough, a horizontal pivot bolt extending through and supported in said side walls, a clutch ring rotatably confined on the bolt between the side walls, a swivel block having a bore rotatably receiving the clutch ring, a generally horizontal arm rigidly connected to the block for swivel movement therewith and projecting from said housing through said slot, a flexible electric cable extending from within said housing and along said arm and then downwardly therefrom, a control pendant suspended from the arm on the lower end of said cable, a counterbalancing spring in said housing having one end connected thereto and the other end connected to said arm through the swivel block, said spring being of sufficient strength to counterbalance the weight of said arm but not that of said pendant, a nut on said bolt for compressing said side walls inwardly to exert sufficient frictional restraint on said clutch ring to counterbalance the weight of said pendant, a plurality of wedging notches of tapered depth formed in the periphery of said clutch ring, and respective rollers in said notches for locking said swivel block to the clutch ring upon downward movement of the arm under the weight of the pendant and for releasing said swivel block for free upward movement under the impetus of the spring when the arm is relieved of the weight of the pendant.

JOSEPH J. ROCK.

REFERENCES CITED

The following references are of record in the file of this patent:

UNITED STATES PATENTS

| Number | Name | Date |
|---|---|---|
| 1,644,231 | Bosworth | Oct. 4, 1927 |
| 1,645,554 | Taylor | Oct. 18, 1927 |
| 1,693,443 | Holt | Nov. 27, 1928 |
| 2,217,407 | Hansen | Oct. 8, 1940 |
| 2,306,992 | Koch | Dec. 29, 1942 |

FOREIGN PATENTS

| Number | Country | Date |
|---|---|---|
| 318,379 | Germany | Dec. 14, 1918 |
| 378,061 | Germany | July 3, 1923 |